(12) United States Patent
Weindorf et al.

(10) Patent No.: US 6,930,737 B2
(45) Date of Patent: Aug. 16, 2005

(54) LED BACKLIGHTING SYSTEM

(75) Inventors: Paul F. L. Weindorf, Novi, MI (US); Adam Zysnarski, Sterling Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 165 days.

(21) Appl. No.: 10/040,864

(22) Filed: Dec. 28, 2001

(65) Prior Publication Data

US 2002/0140880 A1 Oct. 3, 2002

Related U.S. Application Data

(60) Provisional application No. 60/261,760, filed on Jan. 16, 2001.

(51) Int. Cl.[7] .............................................. G02F 1/1335
(52) U.S. Cl. .............................. 349/96; 349/60; 349/69; 349/70; 349/98
(58) Field of Search ............................. 349/64, 67, 96, 349/112, 113, 149, 150, 61, 98, 69–70, 60

(56) References Cited

U.S. PATENT DOCUMENTS

| | | |
|---|---|---|
| 3,925,690 A | 12/1975 | Spence |
| 4,090,189 A | 5/1978 | Fisler |
| 4,118,111 A * | 10/1978 | Laesser ..................... 349/65 |
| 4,160,934 A | 7/1979 | Kirsch |
| 4,909,604 A * | 3/1990 | Kobayashi et al. ........... 349/64 |
| 4,959,642 A | 9/1990 | Sharples |
| 5,105,179 A | 4/1992 | Smith |
| 5,359,691 A | 10/1994 | Tai et al. |
| 5,390,276 A | 2/1995 | Tai et al. |
| 5,422,756 A | 6/1995 | Weber |
| 5,528,720 A | 6/1996 | Winston et al. |
| 5,751,388 A * | 5/1998 | Larson ..................... 349/96 |

(Continued)

FOREIGN PATENT DOCUMENTS

JP   09288278 A  * 11/1997  ......... G02F/1/1345

OTHER PUBLICATIONS

OSRAM Opto Semiconductors brochure entitled "High Brightness—High Temperature Power Topled®", printed by Infineon Technologies, undated, 4 pages.

OSRAM Opto Seminconductors Innovative Technology Sets New Standards brochure entitled "LED in General Lighting," printed by OSRAM Sylvania, Inc., undated, 16 pages.

OSRAM Opto Semiconductors brochure entitled "LED for Traffic Applications", printed by Infineon Technologies, undated, 9 pages.

(Continued)

*Primary Examiner*—Tom Thomas
*Assistant Examiner*—José Díaz
(74) *Attorney, Agent, or Firm*—Brinks Hofer Gilson & Lione (57) ABSTRACT

A liquid crystal display (LCD) device having non-white and white light emitting diodes and a liquid crystal display. A spectrum converting material is positioned between non-white LEDs and the LCD to convert the non-white light from the LEDs toward a white light spectrum. The liquid crystal display may include a plurality of light emitting diodes, a light pipe, and a spectrum converting material. The spectrum converting material may be a phosphorized material located between the plurality of non-white light emitting diodes and the light pipe. A light extracting surface may be located near a first surface of the light pipe, a diffuser located near a second side of the light pipe, where the first and second sides are opposite sides of the light pipe, a reflective polarizer, and an liquid crystal display. The light from the light pipe may passes through the diffuser, the reflective polarizer, before backlighting the liquid crystal display. The non-white LEDs may include blue LED, ultraviolet LEDs, and the like.

9 Claims, 8 Drawing Sheets

U.S. PATENT DOCUMENTS

| | | | |
|---|---|---|---|
| 5,828,488 A | | 10/1998 | Ouderkirk et al. |
| 5,889,568 A | * | 3/1999 | Seraphim et al. ............. 349/73 |
| 5,924,784 A | | 7/1999 | Chliwnyj et al. |
| 6,069,448 A | | 5/2000 | Yeh |
| 6,069,449 A | | 5/2000 | Murakami |
| 6,084,519 A | | 7/2000 | Coulling et al. |
| 6,107,985 A | | 8/2000 | Walukas et al. |
| 6,124,971 A | | 9/2000 | Ouderlirk et al. |
| 6,130,700 A | | 10/2000 | Murayama et al. |
| 6,147,723 A | | 11/2000 | Mochizuki |
| 6,150,771 A | | 11/2000 | Perry |
| 6,342,932 B1 | * | 1/2002 | Terao et al. ................. 349/58 |
| 6,351,079 B1 | | 2/2002 | Willis |
| 6,359,668 B1 | * | 3/2002 | Iijima et al. .................. 349/61 |
| 6,411,046 B1 | | 6/2002 | Muthu |
| 6,448,951 B1 | | 9/2002 | Sakaguchi et al. |
| 6,473,469 B1 | | 10/2002 | Leitch |
| 6,497,946 B1 | * | 12/2002 | Kretman et al. ......... 428/317.9 |
| 2002/0130985 A1 | * | 9/2002 | Weindorf et al. ............. 349/61 |
| 2002/0135572 A1 | * | 9/2002 | Weindorf .................... 345/204 |
| 2003/0164914 A1 | * | 9/2003 | Weber et al. ............... 349/115 |

OTHER PUBLICATIONS

Bond Ply™ 100 brochure entitled Thermally Conductive, Pressure Sensitive Adhesive Tape, printed by The Berquist Company, dated Jan. 25, 2001, 1 page.

Sheldahl product bulletin for Standard Flex, Single Layer Flexible Circuit Interconnect, printed by Sheldahl, undated, 2 pages.

Sheldahl product bulletin for Standard Flex, Double Layer Flexible Circuit Interconnect, printed by Sheldahl, undated, 2 pages.

Sheldahl product bulletin for *Novaflex®* HD, Density Flexible Circuit Interconnect, printed by Sheldahl, undated, 2 pages.

Sheldahl product bulletin for *Novaflex®* VHD, Very High Density Flexible Circuit Interconnect, printed by Sheldahl, undated, 2 pages.

Sheldahl product listing for Flexible Interconnect Products, from <http://www.shedahl.com/Product/FlexInter.htm>, printed from the Internet on Sep. 13, 2001, 2 pages.

* cited by examiner

LED BACKLIGHTING SYSTEM

CROSS REFERENCE TO RELATED APPLICATION

This application is based on U.S. Provisional Application No. 60/261,760 entitled "AMLCD LED Backlighting Navigation Radio Display" and filed on Jan. 16, 2001. The benefit of the filing date of the Provisional Application is claimed for this application. The entire contents of the Provisional Application are incorporated herein by reference.

FIELD

This invention relates generally to the field of light emitting diode (LED) circuits. More specifically, this invention relates to the field of backlighting of liquid crystal displays with non-white LEDs and white LEDs.

BACKGROUND

Backlighting for active matrix liquid crystal displays ("AMLCD") typically uses a cold cathode fluorescent lamp ("CCFL") device. CCFL devices tend to have high back lighting efficacies. CCFL devices have numerous drawbacks. CCFL devices may contain Mercury, a highly dangerous substance that has been banned from many AMLCD applications. CCFL devices may have poor efficacy at lower temperatures, which requires additional circuitry such as a heater element or a boost current circuit. CCFL devices may have a non-linear efficacy curve with respect to temperature. CCFL devices may require an inverter to drive the CCFL device. CCFL devices may require complex control schemes, including light sensors and temperature sensors to provide adequate dimming ratios for night time operations. CCFL devices may have a short life expectancy, especially at lower operating temperatures, and may require additional electromagnetic interference ("EMI") shielding and electric filtering.

Alternatives to CCFL devices for back lighting an AMLCD include Xenon-based devices. Xenon-based backlighting circuits do not contain Mercury, have superior low temperature life expectancy and low temperature operational characteristics, and have less phosphor degradation than CCFL devices. While Xenon lamps correct many of the problems of the CCFL lamp technology, the Xenon lamp technology creates many new problems. For example, Xenon lamps tend to be relatively expensive and require complex control circuitry. Xenon lamps have low efficacy. For example, a Xenon lamp with twice the diameter may provide only half the brightness of a mercury-based CCFL lamp. Because the efficacy of the Xenon lamp may be less than half of a CCFL lamp, the additional power needed to power a Xenon based circuit creates a problem of power consumption.

Another alternative to CCFL devices for backlighting are white LEDs. White LEDs have been used to provide light to light pipes in LCD backlighting devices. White LEDs may be more expensive than colored LEDs.

SUMMARY

The invention provides a liquid crystal display (LCD) device having white and non-white LEDs. The non-white LEDs have a spectrum converting material between non-white LEDs and the LCD to convert the non-white light from the LEDs toward a white light spectrum.

In one aspect, a liquid crystal display backlighting device has a non-white light emitting diode, a liquid crystal display, and a phosphorized material. The phosphorized material is located between the light emitting diode and the liquid crystal display. The phosphorized material down converts light from the light emitting diode toward white light spectral radiance.

In another aspect, a liquid crystal display device has a non-white light emitting diode, a light pipe, a spectrum converting material, a light extracting surface, an enhanced diffuser reflector a diffuser, a reflective polarizer, and a liquid crystal display. The spectrum converting material is between the non-white light emitting diode and the light pipe. The light extracting surface is located near a first side of the light pipe. The diffuser is located near a second side of the light pipe. The first and second sides are opposite sides of the light pipe. Light from the non-white light emitting diode is converted by the spectrum converting material. The light enters the light pipe and passes through the diffuser, the reflective polarizer, and then backlights the liquid crystal display.

In a further aspect, a liquid crystal display device has a light emitting diode, a spectrum converting material, a diffuser, a reflective polarizer, and a liquid crystal display. The light emitting diode emits non-white light. Light from the light emitting diode is converted by the spectrum converting material before the converted light passes through the diffuser and the reflective polarizer, and before backlighting the liquid crystal display.

In yet another aspect, a liquid crystal display has a non-white light emitting diode, a light pipe, a light extracting surface, a diffuser, a reflective polarizer, and a liquid crystal display. The light pipe has a phosphor coating that converts the spectrum of the non-white light emitting diodes and the light pipe. The light extracting surface is located near a first side of the light pipe. The enhanced diffuser reflector is located near an opposite side of the light pipe. The diffuser is located near a second side of the light pipe. The first and second sides are opposite sides of the light pipe. Light from the light pipe passes through the diffuser and the reflective polarizer, and then backlights the liquid crystal display.

In yet a further aspect, a liquid crystal display device has a white light emitting diode, a light pipe, a light extracting surface, a diffuser, a reflective polarizer, and a liquid crystal display. The light extracting surface is located near a side of the light pipe. The diffuser is located near a second side of the light pipe. The first and second sides are opposite sides of the light pipe. Light from the white light emitting diode enters the light pipe and passes through the diffuser, the reflective polarizer, then backlights the liquid crystal display.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE DRAWINGS

The invention may be better understood with reference to the following figures and detailed description. The components in the figures are not necessarily to scale, emphasis being placed upon illustrating the principles of the invention.

DETAILED DESCRIPTION OF THE PREFERRED EMBODIMENTS

A liquid crystal display (LCD) device with backlighting may have a reflective polarizer, backlighting light emitting diodes, a light pipe, and a liquid crystal display. Such an LCD device may be suitable for AMLCD backlighting with sufficient luminosity for day time automotive applications. The LCD device may be an AMLCD based-device. The reflective polarizer may be a DBEF-D reflective polarizer. The LEDs may be white LEDs and non-white LEDs. The non-white LEDs may be blue LEDs, ultraviolet (UV) LEDs, or other colored LEDs. With non-white LEDs, the LCD device has a phosphorized material between the LEDs and the liquid crystal display. The phosphorized material may be a phosphorized rubber or other down converting materials. The phosphorized material converts the light from the non-white LEDs to a white light. This technique allows the color coordinates of the converted light to be selectable with improved edge uniformity, cost savings, and longer LED life. Some conventional white LEDs may use a conversion phosphor layer inside the LED to convert the light coordinates to the desired white color. In one respect, the brightness ratio of white LEDs to non-white LED is about 2.5:1.

During the life time of an LED, the LED's luminance steadily degrade. Non-white LEDs, such as blue LEDs, degrade slower than comparable white LEDs. This can results in brighter LCD backlight over the life of the LED by using non-white LEDs and a phosphorized material.

A significant cost saving may be expected by using non-white LEDs and a phosphorized material over comparable white LEDs devices. Color binning, which is required with white LEDs is eliminated by using colored LEDs.

Figure 1:
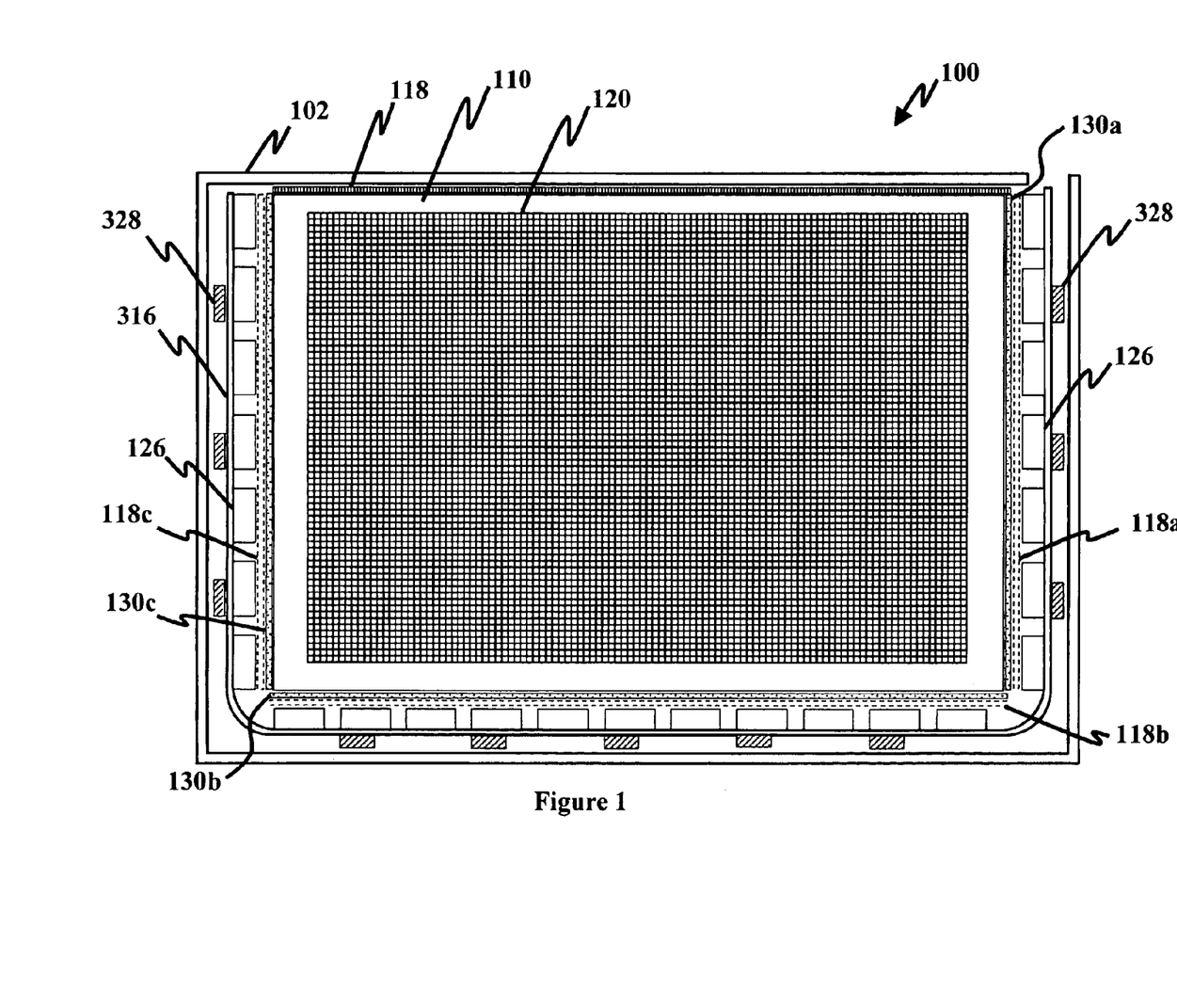
FIG. 1 represents a cross-sectional top view of an LCD backlighting device according to an embodiment.
Figure 2:
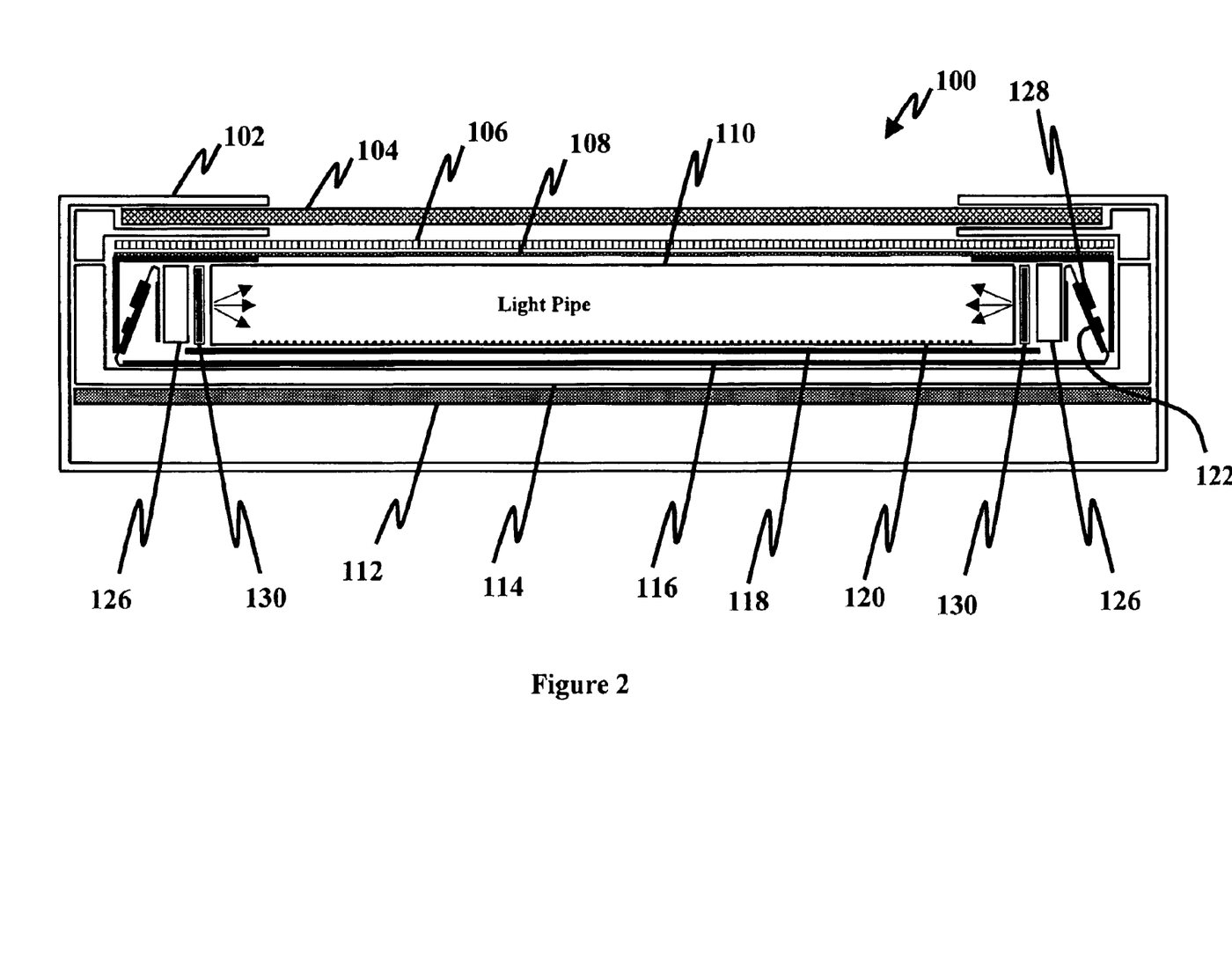
FIG. 2 represents a cross-sectional side view of the LCD backlighting device of FIG. 1.

FIGS. 1 and 2 represent an embodiment of an LCD device 100 that includes non-white LEDs and a phosphorized material. FIG. 1 represents a cross-sectional top view of the LCD 100 backlighting device. FIG. 2 represents a cross-sectional side view of the LCD 100 backlighting device. The LCD device 100 may have other configurations or arrangements including these with fewer or additional arrangements.

Referring to FIG. 1, the LCD device 100 includes a frame 102 and 114, a liquid crystal display (LCD) 104, a reflective polarizer 106, a diffuser 108, a light pipe 110, a printed circuit board 112, a circuit board 116, an enhanced diffuser reflector (EDR) 118, optional EDRs 118a, 118b, and 118c, a light extractor 120, a plurality of LEDS 126, a plurality of LED current control circuits 128, and phosphorized materials 130a, 130b, and 130c. The circuit board 116 may be a flexible circuit board, a rigid circuit board, or the like. The plurality of LEDs 126 may include a plurality of blue LEDs, ultraviolet LEDs, other non-white LEDs, or a combination thereof. The optional EDRs 118a, 118b, and 118c may be located between the LEDs 126 and the respective phosphorized materials 130a, 130b, and 130c. The EDRs 118a, 118b, and 118c may include apertures for the light from the LEDs 126 to shine through to the light pipe 110. The apertures may be shaped to match the active output regions of the LEDs 126. While EDRs are described, other polarization scrambling films may be used.

The phosphorized materials 130a, 130b, and 130c are located between the LEDs 126 and the light pipe 110. The phosphorized materials 130a, 130b, and 130c may include a phosphorized rubber strip. Light from the LEDs 126 passes through the phosphorized materials 130a, 130b, and 130c where a portion of the light is down converted. The down converted light that exits from the phosphorized materials 130a, 130b, and 130c has a white color coordinate. The white light from the phosphorized materials 130a, 130b, and 130c then enters the light pipe 110.

Light that enters the light pipe 110 is internally reflected off the top and bottom surfaces. The light that strikes the top surface of the light pipe 110 at an angle less than the critical angle will pass through the front of the light pipe 110 and strike the diffuser 108. The light that strikes the top of the light pipe 110 at an angle greater than the critical angle will be reflected in the light pipe 110. In one aspect, the light that strikes the EDR 118 passes through the diffuser reflector's first non-diffuse surface and exits the EDR surface. In another aspect, the EDR 118 scrambles the polarization and reflects the light toward the LCD 104. The light extractor surface 120 directs the light toward the LCD 104.

The light then first strikes the reflective polarizer 106, which allows only light with the correct polarization angle to pass. The light that passes through the reflective polarizer 106 backlights the LCD 104 to provide an image. The polarizer angle of the reflective polarizer 106 may be aligned to the polarizer angle on the back of the LCD 104.

Light which strikes the reflective polarizer 106 that is not of the correct polarization angle is reflected back by the reflective polarizer 106 and strikes the front side of the diffuser 108, which is the diffuse surface side. The diffuse surface of the diffuser 108 scrambles the polarization of the light and reflects a significant portion of the light back towards the reflective polarizer 108. The light portion of the reflected light with the correct polarization is passed through the reflective polarizer 106 and backlights the LCD 104. Light continues to be reflected in the light pipe until the light is absorbed or exits from the top of the light pipe 110. The diffuser 108 may be a one-sided diffuser having depolarization backscattering properties in conjunction with a reflective polarizer. The diffuser may comprise polarization scrambling reflective back diffuser materials.

While the diffuser 108 slightly reduces the brightness of the LCD 104 at the outer viewing angles, the diffuser 108 increases the luminance of the light in the central angles more than 20%. The increase is the result of a majority of the light does not reenter the light cavity where the absorption losses are greater. In addition the use of a diffuser 108 greatly reduces the edge effects of the light pipe 110 comparable to the CCFL-based devices. Various diffuser materials may be used on each of the two surfaces of the diffuser 108 to optimize the luminance gain. Other brightness enhancement films (BEF) may also be used to optimize the luminance gain.

The LCD 104 may comprise an active matrix liquid crystal display (AMLCD) or another type of LCD. The frames 102 and 114 may be a metal frame or other type of frame. The frame member 114 may be a metal frame that conducts heat from the circuit board 116. The reflective polarizer 106 may be a dual brightness enhancement film—diffuse (DBEF-D) reflective polarizer. The DBEF-D reflective polarizer 106 allows only light that is properly polarized/orientated to pass to the AMLCD 104. The EDR 118 comprises a polarization scrambling film that scrambles the polarization of the light and reflects the light toward the diffuser 108. The circuit board 116 may have stiffeners 122 on the center portion and on the folded tabs as illustrated in FIG. 1 by the thicker regions of the circuit board 116. Stiffeners 122 may be located on the opposite side of the circuit board 116 from the LEDs 126, on the opposite side of the circuit board 116 from the LED control circuits 128, and in the center portion of the circuit board 116 opposite the exposed ground plane.

Figure 3:
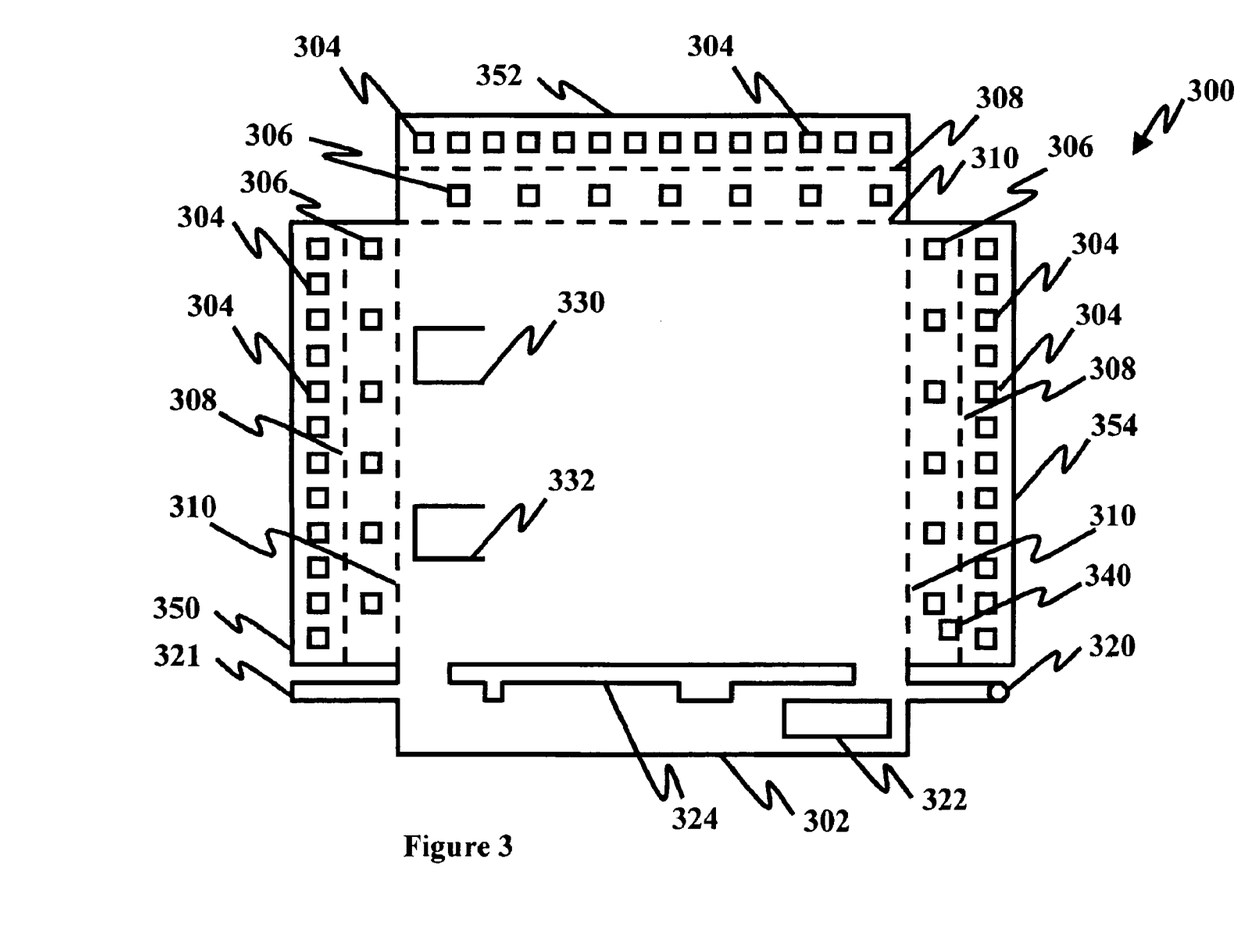
FIG. 3 represents a top view of an embodiment of a flexible LED circuit board with top-light LEDS on two-fold tabs.

The circuit board 116 may include two folds in each tab as illustrated in FIG. 3. The LED control circuits 128 may be on a first folded region of the tabs and the LEDs 126 may be on the second folded region of the tabs. The folds of the tabs of the circuit board 116 may form substantially 45 degree angles, such that the LEDs 126 are perpendicular to the center region of the circuit board 116. The LEDs 126 and the LED control circuits 128 may be located on the same side of the circuit board 116.

The circuit board 116 may also provide a heat sinking capability and interconnection. The center portion of the circuit board 116 may include an exposed ground plane that is in contact with the frame member 114 for transferring heat generated by the LEDs to the frame member 114. An optional thermal conductive material may be disposed between the circuit board 116 and the frame member 114 to improve the thermal conductivity. The thermal conductive material is especially important when an air gap exists between the circuit board 116 and the frame member 114. The thermal conductive material may be a pressure sensitive adhesive (PSA) material such as Bond Ply, which is available from The Bergquist Company in Chanhassen, Minn.

In one aspect, the circuit board 116 is a flexible circuit board having elastomeric properties, which allow the board to be deformed without damage to the components and the connections between the components. In another embodiment, the circuit board 116 is a flexible circuit board that may be capable of small bend radiuses less than 1 mm and may be extremely thin, such as 2 mils thick with 35$\mu$ of copper on both sides totaling approximately 3.8 mils. The base insulator may be Kapton-based substance, such as Polyimide, that is extremely resilient to environmental and mechanical stresses. Eight mil space and trace is available for the less expensive HD material. The circuit board 116 may also assist in thermal heat sinking. The cathodes ends of the LEDs 126 may be soldered to a ground plane on the circuit board 116 that is connected with a frame member 114 to heat sink heat from the LEDs. The heat flow path may dissipate toward the rear of the LCD display 100. The LCD 104 may be a 3.8" AMLCD.

In one aspect, the phosphorized material 130 and the light pipe 110 are combined to form a phosphor coated or impregnated light pipe for use with the non-white LEDs. In another aspect, the phosphor material may be placed between the light pipe 110 and the reflective polarizer 106. Various means exist to couple the light from LEDs into a light pipe, such as using total internal reflection with the diodes facing up or lensing the edge of the light pipe. Other techniques of reflective polarizers may be used including a wire grid reflective polarizer. An LCD device may have the LEDs placed behind the AMLCD, thus eliminating the need for a light pipe. In this case, the phosphor material would be placed somewhere in the optical path between the LEDs and the reflective polarizer.

The phosphorized material 130 may be a phosphorized silicone rubber, such as part number KLY5-8D3 from Asahi Rubber Inc. (ARI International Corporation) of Arlington Heights, Ill. The LEDs 126 may be any type or make of LEDs including Infineon Technology AG. part number LB A673-N24. The Infineon LED has a luminance rating of 35–45 mcd which corresponds to 105–135 mim per LED. Other LEDs, including more powerful LEDs, may be used.

The relative spectral radiance from blue LEDs and Asahi Rubber's phosphorized rubber, a reflective polarizer with diffuser configuration, and an EDR results in an estimated 245 Nits for an LCD device with 50 LEDs of the more powerful Q1 luminance level parts with a rating of 2×(71–90 mcd) and 30 mA POWER TOPLED®. The blue LEDs at 245 Nits may have about 25% less luminance than with white LEDs that have 332 Nits. The may be due in part to a non-optimal phosphor conversion. Once optimized, the converted blue light may become more greenish similar to the light produced by conventional white LEDs. Another advantage of using the phosphorized material is that the white color coordinates of the converted light can be controlled.

FIG. 3 represents a top view of a flexible circuit board layout 300 for a LED circuit. The flexible circuit board-based device 300 includes a flexible circuit board 302 and various devices, including the parallel LED circuit 400 (FIG. 4) or a series LED drive circuit or other circuits, may be mounted on the flexible circuit board 302. While the flexible circuit board 302 is shown in a completely flat position, when in use, the flexible circuit board 302 may have the tabs 350, 352, and 354 folded along the dashed lines 308 and 310. The folds may be at substantially 45 degrees such that the LEDs 304 face inwardly and are substantially perpendicular to the center region of the flexible circuit board 302. A folded flexible circuit board 302 may be configured as the circuit board 116 illustrated in the cross-section of FIG. 2. Other configurations may also be used including a single fold configuration.

While FIG. 3 illustrates 12 to 14 LEDs per tab region, other number of LEDs may be used, for example, 2 to 200 LEDs per tab region. The number of LEDs per each tab may be, but need not be, the same. Different types of LEDs may be used on a flexible circuit board 302. Likewise, while FIG. 3 illustrates a two to one ratio of LED control circuits 306 to LEDs 304, the number of LED control circuits 306 may vary depending on the application.

The flexible circuit board 302 may be any flexible circuit board material, such as Standard Flex, Novaflex® HD, and Novaflex® VHD, available from Sheldahl Inc. of Northfield, Minn.

The LEDs 304 may be located around the perimeter of the flexible circuit board 302. The folding of the flexible circuit board 302 enables the LEDs 304 and the LED control circuits 306 and other related circuits, for such as circuit 322, to be located on one single of the flexible circuit board 302. The circuit 322 may correspond to circuits 406, 408 and 410 of FIG. 4. The temperature sensor 340, may correspond to the thermal resistor RT1 of FIG. 4. Such a single sided component placement is desirable for cost and manufacturability reasons. Additionally, when the components are located on the top side of the flexible circuit board 302 stiffeners, such as the stiffener 122 illustrated in FIG. 2, may be used across portions of the bottom side of the flexible circuit board 302. The stiffener may be a polyester-based stiffener material.

The flexible circuit board 302 may be used to directly substituted CCFL circuits with little or no mechanical modifications. The flexible circuit board 302 eliminates the rear metal shield, provides a location for the LED control circuit 306, and may use a flexible interconnect for power and PWM control.

The top surface of the flexible circuit board 302 may include an exposed ground plane. The ground plane may include a majority of the central region of the flexible circuit board 302 and regions in the tabs 350, 352 and 354 that are not used for routing power and signals between the LEDs 304, the LED control circuits 306, and the other circuits 322. The bottom side of the flexible circuit board 302 may include an exposed voltage plane and signal routing lines.

In one aspect, the flexible circuit board 302 may include ground tabs 330 and 332. The ground tabs 330 and 332 may be flexible tabs that can be inserted into an existing LCD frame to connect the ground plane of the flexible circuit board 302 to the frame. The ground plane on the top of the flexible circuit board 302 may be connected directly with a frame to provide LED heat sinking by connecting the cathodes of the LEDs to a heat sinking device, such as a metal frame. Such heat sinking results in a passive LED cooling method that is more cost effective than the other methods such as thermal electric coolers or spring clips. While the flexible circuit board 302 costs more than traditional rigid circuit boards, directly mounting the LEDs 304 and the LED control circuits 306 to the flexible circuit board 302 eliminates the need for daughter boards or other interconnecting devices or the more expensive side-lighting LEDs.

Also, the flexible circuit board 302 may include various cutouts, such as cutout 324, so that the flexible circuit board 302 may directly replace a CCFL device. Additionally, mounting tabs 320 and 321 and other devices may be integrated into the flexible circuit board 302 to allow the flexible circuit board 302 to directly replace a CCFL device or other device.

Figure 4:
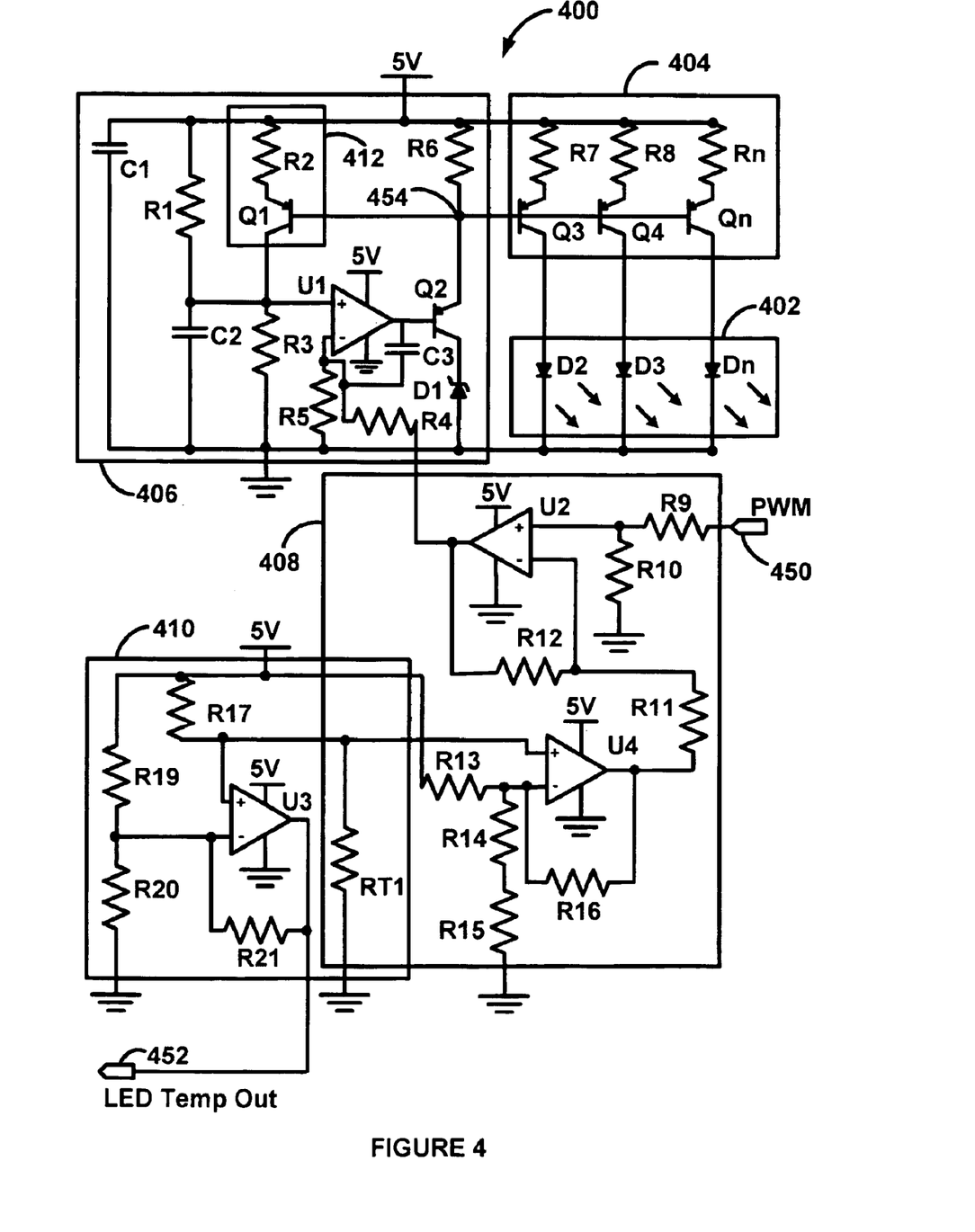
FIG. 4 represents a circuit diagram of an LED circuit according to an embodiment.

FIG. 4 represents a circuit diagram of a parallel LED circuit 400 according to an embodiment. The LED circuit 400 may include a parallel LED array 402, a current source circuit 404, a control circuit 406, an optional temperature derating circuit 408, and an optional temperature monitoring circuit 410. While the LED circuit 400 is described with reference to a parallel LED drive circuit, other LED drive circuits may also be used including a series drive circuit and a hybrid drive circuit.

The parallel LED array 402 includes a plurality of LEDs D2, D3, and Dn connected in parallel. The LEDs may be white or colored LEDs, such as red, green, and blue LEDs, other colored LEDs, ultraviolet (UV) LEDs, or a combination of different types of LEDs. The LED labeled "Dn" represents the nth LED where n is the total number of diodes. While FIG. 4 illustrates only three LEDs in the LED array 402, the LED array 402 may have any number of LEDs, for example 2 to 1,000 LEDs for some applications and many more LEDs, such as 50,000, for other applications. There essentially is no limit to the number of LEDs that could be in the LED array 402. Any additional LEDs will have corresponding current source transistors and emitter resistors in a similar configuration as the current source transistors Q3, Q4, and Qn and the emitter resistors R7, R8, and Rn.

The LEDs D2, D3, and Dn may each be separately current sourced to provide consistent LED brightness. This eliminates most brightness variations caused by LED forward voltage variations. The cathode terminals of each of the LEDs D2, D3, and Dn are connected with ground at a ground node. The common ground connection may be connected with a heat sink to transfer heat away from the LEDs. The anode terminal of the LEDs D2, D3, Dn connects with the current source transistor Q3, Q4, Qn. By connecting the cathode terminal of the parallel LEDs D2, D3, and Dn diodes to ground, a superior thermal conductive path is established that reduces the LED junction temperature and equalizes the junction temperatures among the parallel diodes. Since the luminous intensity of an LED decreases dramatically as the junction temperature increases, equalization of the junction temperatures helps maintain a more uniform brightness among the LEDs D2, D3, and Dn.

The current source circuit 404 supplies the LED array 402 with substantially uniform current to each LED, D2, D3, and Dn. Since the brightness of an LED is directly related to the current passing through the LED, accurate control of the LED current allows proper LED performance and life expectancy. The anode terminals of the LEDs D2, D3, and Dn are connected with a collector terminal of the respective current source transistor, Q3, Q4, and Qn. A common control node interconnects the base terminals of the current source transistors Q3, Q4, and Qn. The emitter terminals of the current source transistors, Q3, Q4, and Qn, are connected to the supply voltage via an emitter resistor R7, R8, and Rn, respectively. The current source transistors, Q3, Q4, and Qn may have substantially identical characteristics. Thus, the characteristic of the current source transistors, Q3, Q4, and Qn with respect to various collector currents (Ic) and base to emitter voltages (Vbe) will be substantially similar since the transistor temperatures will be substantially identical. The base terminals of the current source transistors, Q3, Q4, and Qn are connected at a common control node 454.

The emitter resistors R7, R8, and Rn further reduce variations in the current from the current source transistors, Q3, Q4, and Qn. Thus, the parallel LEDs D2, D3, and Dn maintain consistent brightness. The emitter resistor R7, R8, and Rn preferably may have substantially identical characteristics. When the LEDs, D2, D3, and Dn, are white LEDs, the emitter resistors R7, R8, and Rn may be 0.1 to 1,000 Ohm resistors. The emitter resistors R7, R8, and Rn preferably have low resistance, such as 5 Ohms. When color diodes are being driven by the current source circuit 404, the value of the emitter resistors R7, R8, and Rn may be selected to achieve a different desired current level for each LED to achieve proper white balance.

The control circuit 406 provides fault tolerance protection when one or more LEDs in the LED array 402 fails. An LED may fail by a short or an open. When an LED fails open, the LED disconnects the collector terminal of the current source transistor. When an LED fails closed, the LED connects the collector terminal of the current source transistor to ground. Such LED failures tend to affect the voltage at the common control node 454 of the current source transistors. The control circuit 406 stabilizes the voltage at the common base node via feedback circuitry. When the voltage at the common base node is stable, the remaining LEDs continue to be driven at the prescribed level.

The transistor Q2 and the zener diode D1 provide load dumping when an LED fails open. The current that would have passed through the LED is diverted to the base terminal of the current source transistor connected with the LED that is open. This additional current is received by the transistor Q2 and dissipated through the zener diode D1. The number of LEDs that may fail in the open position while the LED circuit 400 remains operational is limited by the power rating of the transistor Q2 and the zener diode D1. For example, a zener diode D1 with a derated power limit of 500 mW allows for four open LEDs. A resistor or other device may alternatively by used in place of the zener diode D1.

An LED failure by a short is an unlikely failure. However, if an LED shorts out, the current source transistor associated with that LED continues to supply the shorted LED with the same current as the other LEDs. Thus, the brightness of the other LED is unaffected by the shorted LED.

A sample current source circuit 412 includes a transistor Q1 and a resistor R2 that have characteristics that are substantially similar to those of the current control transistors Q3, Q4, and Qn and the emitter resistors R7, R8, and Rn. By mirroring the characteristics of the current source circuit, the current through the sample current source circuit 412 may be monitored to estimate the current that passes through the LEDs. The sample current source circuit 412 provides a current substantially similar to the current that passes through each of the LEDs, D2, D3, Dn. The sample current is converted by a resistor R3 to a reference voltage. The sample current source circuit 412 eliminates the need for additional circuitry to sample the actual current through the LEDs, D2, D3, Dn. The sample current source circuit 412 allows the cathodes of the LEDs, D2, D3, Dn to be connected with the ground node instead of sampling circuitry. The resistor R1 provides an offset to ensure that the LEDs can be completely turned off even with a small output voltage at node 450 commonly associated with PWM controllers.

The control circuit 406 uses a current feedback circuit to more precisely control the current to the parallel LEDs. The additional control allows the parallel LEDs to be operated closer to their maximum rating, which is where the LEDs are at their brightest. The error amplifier U1 of the control circuit 406, may be configured to provide a bandwidth limiting function that eliminates high rate of change currents transients. This elimination reduces or completely suppresses electromagnetic interference (EMI) emissions.

The error amplifier U1, an operational amplifier, typically operates in a linear mode of operation. The input to the error amplifier U1 receives a voltage divided output from the operational amplifier U2. The output voltage from operational amplifier U2 is divided by the voltage divider formed by the resistors R4 and R5.

The temperature derating circuit 408 derates current to the LED array 402 as the temperature increases to prolong the life expectancy of the LEDs. The temperature derating circuit 408 is connected with the control circuit 406 and an intensity input node 450. The input voltage from the operational amplifier U2 controls the brightness of the LED array 402. The operational amplifier U2 is configured as a differential amplifier where the ratios of the operational amplifier's resistors are substantially balanced, that is R12/R11= R10/R9. When the ratios of the operational amplifier's resistor R12/R11 and R10/R9 are both substantially equal to one, the differential gain of the operational amplifier U2 is substantially unity. When the output of the operational amplifier U4 is at substantially ground during a non-derating condition, the operational amplifier U2 passes the input signal from input node 450 with the gain set by the resistor ratios, which may be a unity gain. The intensity level signal may be a steady DC voltage, a pulse width modulated signal, or an other type of signal.

The derating operational amplifier U4 normally operates in a rail-to-rail mode. When the LED array 402 is operating in a normal operating temperature range, the output of the derating operational amplifier U4, known as the temperature derating level, is substantially ground. As the temperature of the LED array 402 increases, the temperature derating level increases after a predetermined LED threshold temperature is reached. Since the thermal resistor RT1 is connected with the same ground and preferably in close proximity to the LED array 402, the resistance of the thermal resistor RT1 varies as a function of the temperature of the solder near the cathode terminals of the LEDs D2, D3, and Dn. The thermal resistor RT1, also called a temperature sensor, has a resistance that varies as a function of a measured temperature. For example, the thermal resistor RT1 may be a model KT230 available from Infineon Technologies A.G. 1730 N. First Street, San Jose, Calif. 95112. The model KT230 is a temperature dependent resistor with a resistance tolerances of +/−3% at 1,000 Ohms, a temperature range of −50 degree Centigrade to +150 degree Centigrade, and is available in SMD or leaded or customized packages. The model KT230 has a linear output, a positive temperature coefficient, a long term stability, a fast response time, and is polarity independent due to symmetrical construction. Other commonly available temperature sensors, such as models LM135 and LM50 from the National Semiconductor, Inc., may also be used.

The operational amplifier U2 receives a higher output voltage from the derating operational amplifier U4 through resistor R11. The output voltage from the derating operational amplifier U4 acts as a negative offset to the input voltage at the input node 450. By reducing the output voltage of the operational amplifier U2, the error amplifier U1 increases its output voltage which causes the voltage at the common base node 454 to be increased. This results in the current source transistors Q3, Q4, and Qn allowing less current to flow through the LED array 402. The LEDs D2, D3, and Dn then become less bright as the temperature increases. For example, if the input voltage at the input node 450 is 5 VDC and the temperature derating level is 1.5 V, the output of the operation amplifier U2 is 3.5V. The temperature derating circuit 408 may shut off the LED array 402 if the measured temperature reaches a predetermined temperature threshold.

The temperature monitoring circuit 410 provides a temperature output signal at output node 452 that indicates a temperature associated with the LED array 402. The LED temperature output signal may be a function of the LED temperature as measured by the thermal resistor RT1. The thermal resistor RT1 may be used for the temperature monitoring circuit 410 and the temperature derating circuit 408. The temperature monitor amplifier U3 monitors a voltage difference between a first voltage divider circuit R19 and R20 and a second voltage divider circuit R17 and RT1 to provide an output voltage that is proportional to the LED temperature. The output of the temperature monitor amplifier U3 is connected with the output node 452. The temperature monitoring output 452 may be used by an external controller to adjust the drive level to input 450 to compensate for LED luminance changes as a function of temperature.

The input node 450 of the LED circuit 400 may receive an input signal from a microprocessor or other controller. The input signal may be a pulse width modulated ("PWM") signal, a DC voltage signal, or other type of signal. A PWM input signal controls the intensity of the LED based on the duty cycle and/or the voltage level of the input signal. Generally, as the duty cycle of the input signal increases, the LEDs D2, D3, and Dn become brighter. A DC voltage input signal controls the intensity of the LED based the voltage level of the input signal. Generally, as the voltage level at the input node 450 increases, the LEDs D2, D3, and Dn become brighter.

The LED circuit 400 may operate with a supply voltage of between 1 volt to 15 volts, and preferably it operates at approximately 5 volts. Since the LED circuit 400 includes a parallel LED array 402, a high power inverter and higher supply voltage commonly required for serial LED circuits is not required. The LED circuit 400 may be a band limited low electromagnetic interference circuit controlled by the values of R4, R5, C3, R3, and C2.

The LED circuit 400 of FIG. 4 may include components as indicated in Table 1. Other types of components and components of different values may also be used in the LED circuit 400.

TABLE 1

| Ref. | Description |
| --- | --- |
| C1 | A capacitor, for example a 1 uF capacitor. |
| C2–3 | A capacitor, for example a 0.01 uF capacitor. |
| Q1–4 | A PNP transistor, for example, a model MBT3906DW1T1 transistor from Motorola, Inc. that is available in a dual package. |
| Qn | A PNP transistor, for example, a model MBT3906DW1T1 transistor from Motorola, Inc. that is available in a dual package. |
| D1 | A Zener diode, for example a 3.3 volt Zener diode. |
| D2–3 | A light emitting diode. For example, white SIDELED Infineon model LWA67C, a white LED from Infineon model LW E673 or LW E67C, red LED model LSA677-Q, green LED model LTA673-R24, or a blue LED LBA673-N24 all from Infineon Technology AG. |
| Dn | A light emitting diode. For example, white SIDELED Infineon model LWA67C, a white LED from Infineon model LW E673 or LW E67C, red LED model LSA677-Q, green LED model LTA673-R24, or a blue LED LBA673-N24 all from Infineon Technology AG. |
| U1–4 | An operational amplifier, for example a model LMV321 available from National Semiconductor Corp. or a model TLC 2274 Rail-to-Rail Operational Amplifier available from Texas Instruments, Inc. |
| R1 | A resistor, for example a 4.99K Ohms resistor. Other resistance values may also be used, for example, 0.5K to 50K Ohms. |
| R2 | A resistor, for example a 5 Ohms resistor. Other resistance values may also be used, for example, 0.5 to 500 Ohms. |
| R3 | A resistor, for example a 100 Ohms resistor. Other resistance values may also be used, for example, 0.1 to 10K Ohms. |
| R4 | A resistor, for example a 16.5k Ohms resistor. Other resistance values may also be used, for example, 165 to 1650K Ohms. |
| R5 | A resistor, for example a 25K Ohms resistor. Other resistance values may also be used, for example, 250 to 2,500K Ohms. |
| R6 | A resistor, for example a 4.99K Ohms resistor. Other resistance values may also be used, for example, 0.5K to 50K Ohms. |
| R7 | A resistor, for example a 5 Ohms resistor. Other resistance values may also be used, for example, 0.5 to 500 Ohms. |
| R8 | A resistor, for example a 5 Ohms resistor. Other resistance values may also be used, for example, 0.5 to 500 Ohms. |
| Rn | A resistor, for example a 5 Ohms resistor. Other resistance values may also be used, for example, 0.5 to 500 Ohms. |
| R9–21 | A resistor, for example a 20K Ohms resistor. Other resistance values may also be used, for example, 200 to 200K Ohms. |
| RT1 | A resistor with a temperature dependant resistance, for example KT230 available from Infineon Technology A.G. |

Figure 5:
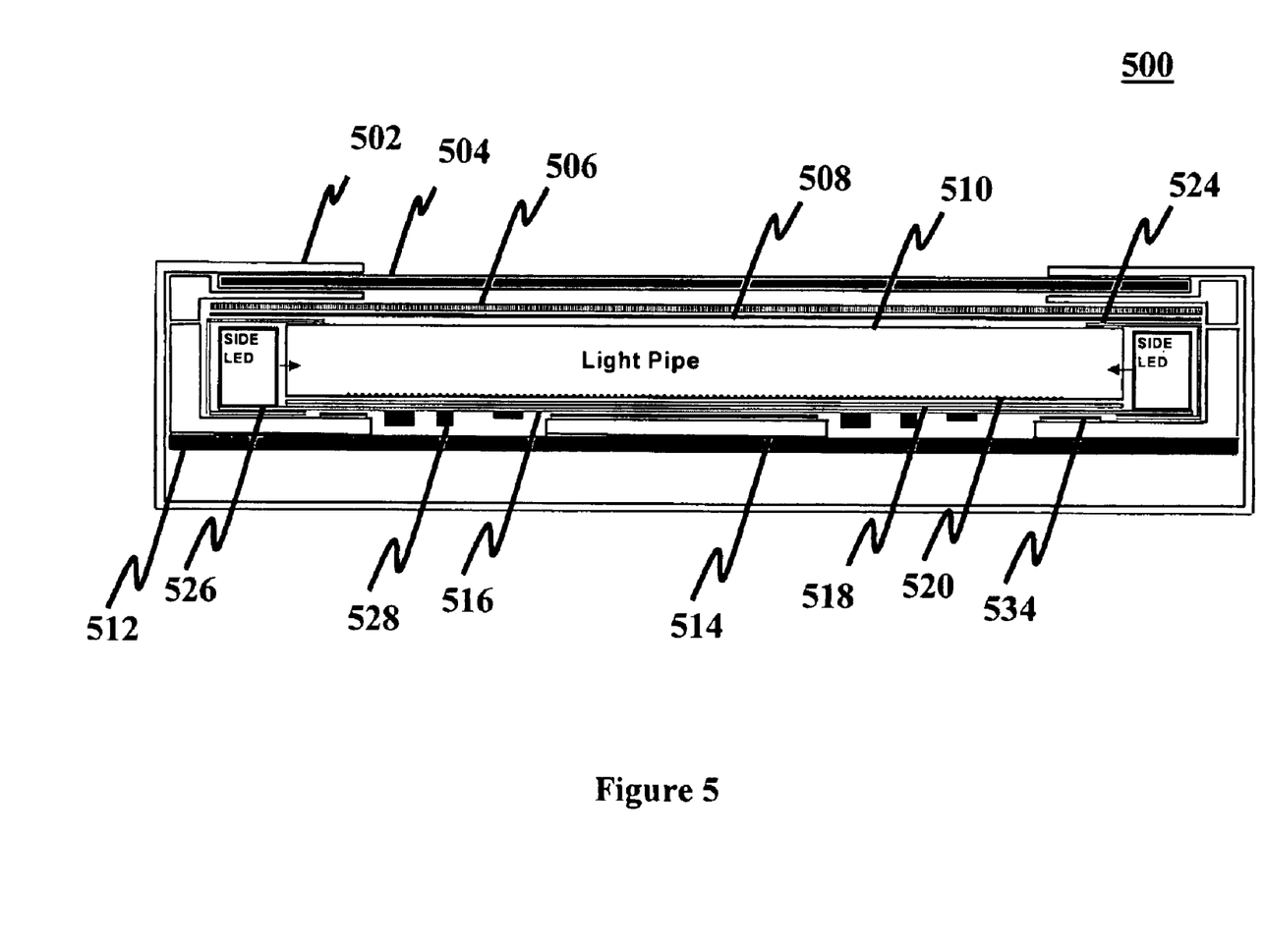
FIG. 5 represents an embodiment of an LCD device that includes white LEDS.

FIG. 5 represents an embodiment of an LCD device 500 that includes white LEDs. The LCD device 500 has corresponding element numbers and a similar operation to the LCD device 100 shown in FIGS. 1 and 2. However, the LCD device 500 uses white LEDs rather than the non-white LEDs shown in LCD device 100. The LCD device 500 also does not need the phosphorized material used in the LCD device 100. However, LCD device 500 may use a phosphorized material to improve the light properties from a white LED.

The LCD device 500 includes a frame 502 and 514, a liquid crystal display (LCD) 504, a reflective polarizer 506, a diffuser 508, a light pipe 510, an enhanced specular reflector (ESR) 524, a printed circuit board 512, side LED arrays 526, an LED controller circuit 528, a circuit board 516, an enhanced diffuser reflector (EDR) 518, a light extracting surface 520, and a thermally conductive material 534. The LCD 504 may be an active matrix liquid crystal display (AMLCD). The side LED arrays 526 comprise white LEDs as previously discussed. The LED arrays 526 and the ESR 512 have a side reflective configuration as discussed below. In an aspect, the LCD device 500 with white LED's has about one-third the LEDs as a comparable LCD device using non-white LEDs. In another aspect, the white LEDs have about 2.5 times the brightness of the non-white LEDs. The ESR 524 and the thermally conductive material 534 are discussed below.

Figure 6:
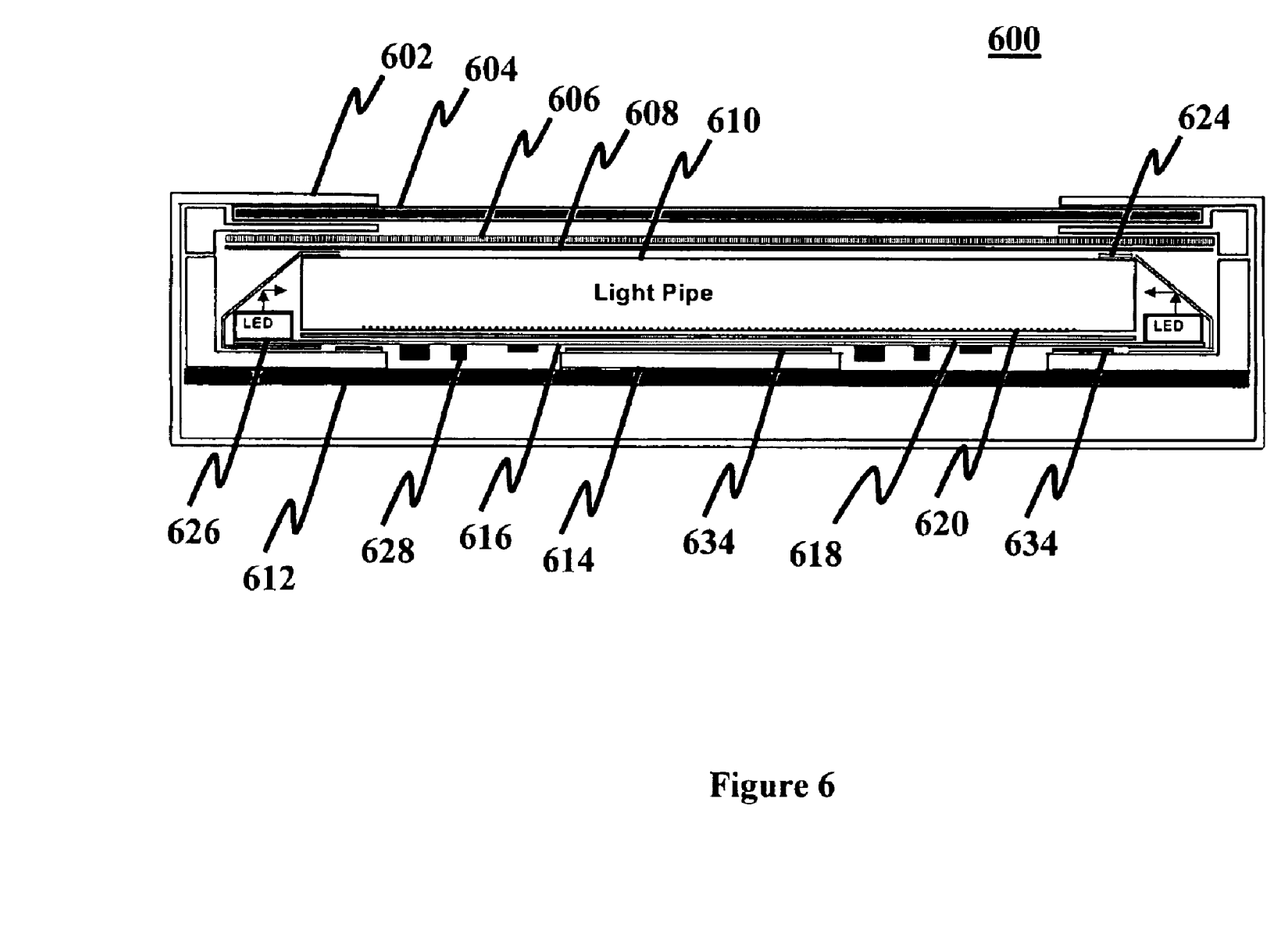
FIG. 6 represents another embodiment of an LCD device that includes white LEDS.

FIG. 6 represents another embodiment of an LCD device 600 that includes white LEDs. The LCD device 600 has corresponding element numbers and a similar operation to the LCD device 500 shown in FIG. 5. The LCD device 600 includes a frame 602 and 614, an LCD or an AMLCD 604, a reflective polarizer 606, a diffuser 608, a light pipe 610, an enhanced specular reflector (ESR) 624, a printed circuit board 612, an LED array 626, an LED controller circuit 628, a circuit board 616, an enhanced diffuser reflector (EDR) 618, a thermally conductive material 634, and a light extracting surface 620. The circuit board 616 may be thinner than the printed circuit board 612. The circuit board 616 is thermally connected with the frame 602 via the thermally conductive material 634. The LED 626 and the ESR 624 have a top reflective configuration. The ESR 624 may be angled at about 45 degrees to reflect the light from the LED 626 such that a side LED is not required. The frame 602 also may form a light cavity that contains the light pipe 610, the ESR 612, the LED array 626, and the diffuser 608. The light cavity may include the circuit board 616.

Figure 7:
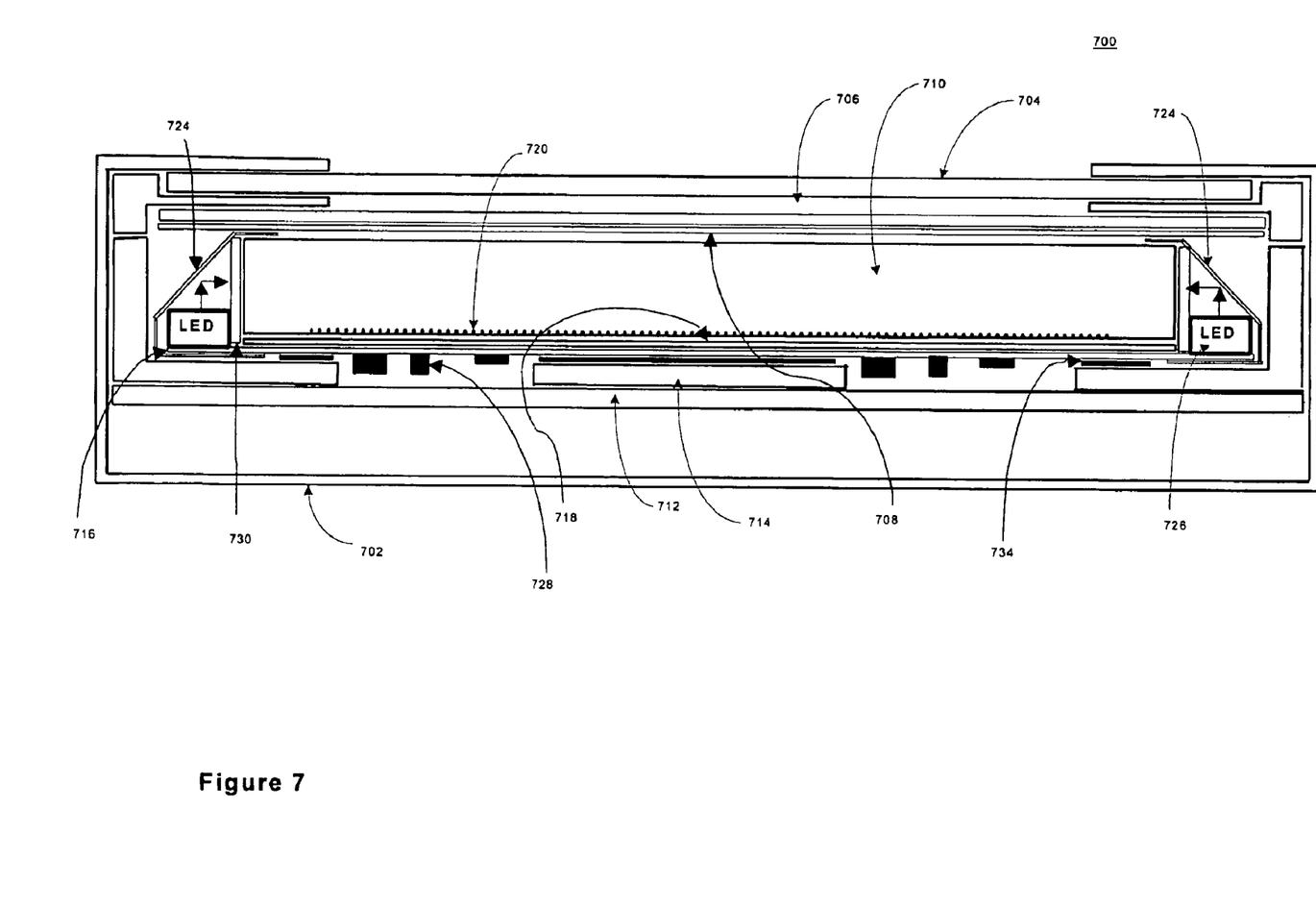
FIG. 7 represents another embodiment of an LCD device that includes non-white LEDS.

FIG. 7 represents another embodiment of an LCD device 700 that includes non-white LEDs. The LCD device 700 has corresponding element numbers and a similar operation to the LCD device 100 shown in FIGS. 1 and 2. The LCD device 700 includes a frame 702 and 714, an LCD or an AMLCD 704, a reflective polarizer 706, a diffuser 708, a light pipe 710, an enhanced specular reflector (ESR) 724, a printed circuit board 712, LEDs 726, an LED controller circuit 728, a circuit board 716, an enhanced diffuser reflector (EDR) 718, a light extracting surface 720, and a thermally conductive material 734. The LEDs comprise non-white LEDs as previously discussed.

The ESR 724 is configured at the ends of the light pipe 710. The ESR 724 reflects light from the LEDs 726 into the light pipe 710. In one aspect, each LED 726 has a top reflective configuration in relation to the light pipe 710 and the ESR 724. The LEDs 726 are positioned so the top or light emitting surfaces of the LEDs 726 are essentially perpendicular to the ends of the light pipe 770. In one aspect, ESR 724 has a planar surface forming an angle of about 45 degrees with the top surface of the LED and forming an angle of about 45 degrees with the end of the light pipe. Light from the LEDs is top reflected by the ESR 724 into the light pipe 710.

The thermally conductive material 734 is disposed between the frame 714 and the circuit board 716. In one aspect, the thermally conductive material is a thermally conductive pressure sensitive adhesive such as the Bergquist Bond ply™ 100 available from the Bergquist Company in Chanhassen, Minn. Other thermally conductive adhesives and materials may be used.

Figure 8:
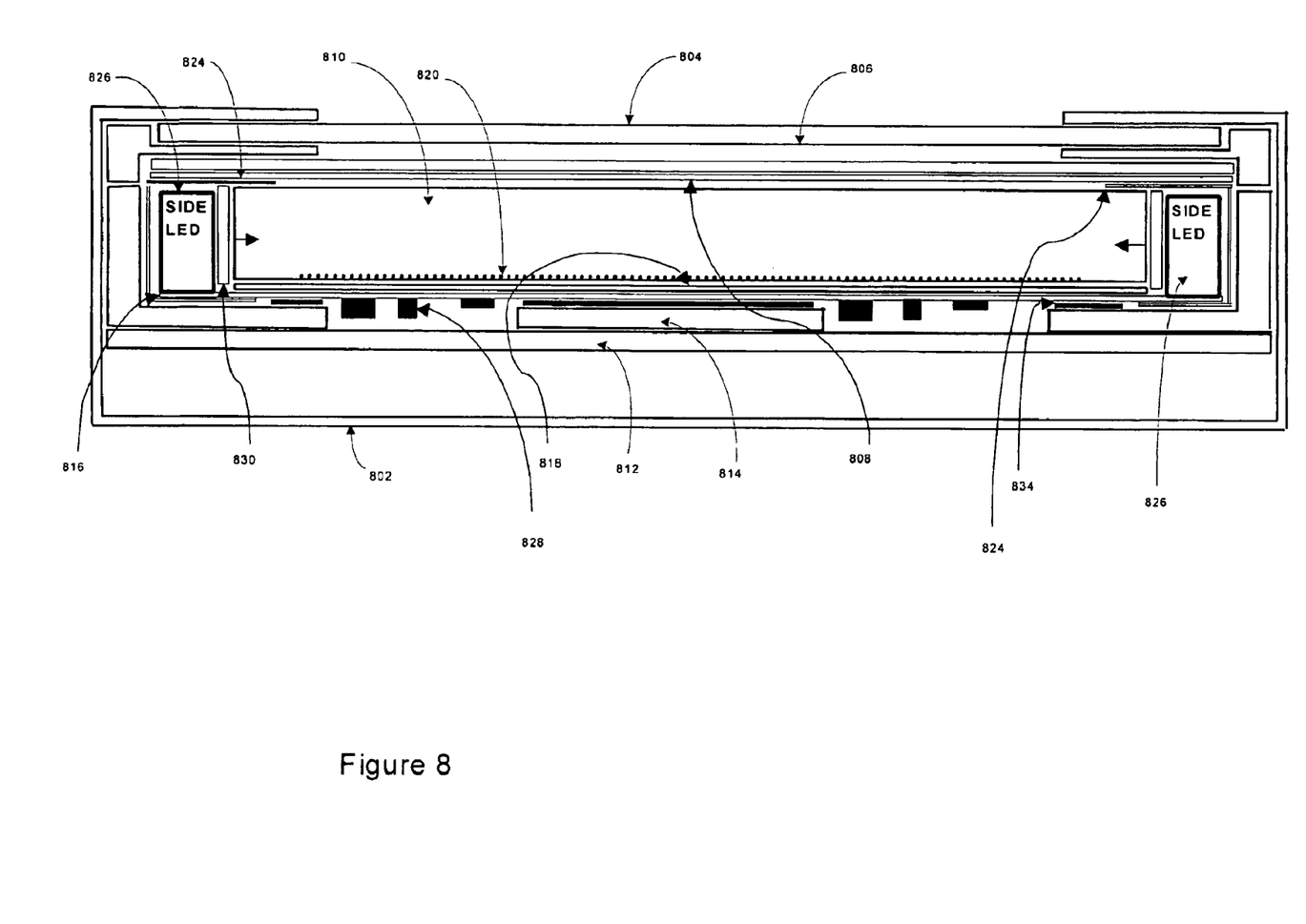
FIG. 8 represents a further embodiment of an LCD device that includes non-white LEDS.

FIG. 8 represents a further embodiment of an LCD device 800 that includes non-white LEDs. The LCD device 800 has corresponding element numbers and a similar operation to the LCD device 700 shown in FIG. 7. The LCD device 800 includes a frame 802 and 814, an LCD or an AMLCD 804, a reflective polarizer 806, a diffuser 808, a light pipe 810, an enhanced specular reflector (ESR) 824, a printed circuit board 812, a side LED array 826, and LED controller circuit 828, a circuit board 816, a thermally conductive material 834, an enhanced diffuser reflector (EDR) 818, and a light extracting surface 820. The circuit board 816 may be thinner than the printed circuit board 812. The circuit board 816 is thermally connected with the frame 802 via the thermally conductive material 834. The LED 826 and the ESR 824 have a side reflective configuration.

The LCD devices may have other configurations and arrangements including those with fewer and additional parts. The edge lighting configurations, including the side and top reflective versions shown in the embodiments, can provide color diffuser and luminescence uniformity advantages. The light pipe also may have a square, rectangular, or other shape to reduce or eliminate the direct observation of the LEDs by a user.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A liquid crystal display (LCD) device, comprising:
    a white light emitting diode;
    a light pipe;
    a light extracting surface located near a first side al the light pipe;
    a diffuser located near a second side of the light pipe, where the first and second sides are opposite sides of the light pipe;
    a reflective polarizer;
    a liquid crystal display;
    a first polarization scrambling material located along the light pipe opposite the liquid crystal display;
    a second polarization scrambling material between the white light emitting diode and the light pipe; and
    wherein light from the white light emitting diode enters the light pipe and passes through the diffuser, the reflective polarizer, then backlights the liquid crystal display.

2. The LCD device of claim 1, wherein the white light emitting diode is located along a perimeter of a circuit board.

3. The LCD device of claim 2, wherein the circuit board comprises a flexible circuit board.

4. The LCD device of claim 2, further comprising a thermally conductive material between the circuit board and a frame.

5. The LCD device of claim 2, wherein the white light emitting diode has a top reflective orientation with the light pipe.

6. The LCD device of claim 2, wherein the white light emitting diode has a side reflective orientation with the light pipe.

7. The LCD device of claim 1, wherein the second polarization scrambling material forms apertures near the white light emitting diode.

8. The LCD device of claim 1, wherein the first polarization scrambling material comprises an enhanced diffuser reflector.

9. The LCD device of claim 1, further comprising an enhanced specular reflector disposed near the white light emitting diode and the light pipe, where light form the white light emitting diode reflects from the enhanced specular reflector into the light pipe.

* * * * *

UNITED STATES PATENT AND TRADEMARK OFFICE
CERTIFICATE OF CORRECTION

PATENT NO. : 6,930,737 B2
DATED : August 16, 2005
INVENTOR(S) : Paul F. L. Weindorf et al.

It is certified that error appears in the above-identified patent and that said Letters Patent is hereby corrected as shown below:

Column 13,
Line 36, after "near a first side" delete "al" and substitute -- of --.

Signed and Sealed this

Ninth Day of May, 2006

JON W. DUDAS
*Director of the United States Patent and Trademark Office*